June 24, 1952   F. P. DUCATMAN ET AL   2,601,266
METHOD OF ATTACHING ENDS TO CYLINDRICAL OBJECTS OF RESIN
IMPREGNATED CLOTH LAMINATES AND PRODUCTS SO PRODUCED
Filed Oct. 17, 1950   2 SHEETS—SHEET 1

INVENTOR.
F. P. DUCATMAN
C. E. EISENMANN
BY
Greene, Pineles & Dunn
ATTORNEYS

INVENTOR.
F. P. DUCATMAN
C. E. EISENMANN
BY
Greene, Pinelis & Durr
ATTORNEYS

UNITED STATES PATENT OFFICE 2,601,266

METHOD OF ATTACHING ENDS TO CYLINDRICAL OBJECTS OF RESIN IMPREGNATED CLOTH LAMINATES AND PRODUCTS SO PRODUCED

Frederich P. Ducatman, Plainfield, and Charles E. Eisenmann, New Brunswick, N. J., assignors to Steatite Research Corporation, Keasbey, N. J., a corporation of Delaware Application October 17, 1950, Serial No. 190,576

5 Claims. (Cl. 154—83)

This invention relates to an integrally formed closure structure for a laminated plastic vessel or pipe section and to the process of making same.

An object of this invention is to provide a laminated plastic vessel or pipe section with an end seal that is fluidtight and resistant to high internal pressure.

Another object of the invention is to provide a process of forming a fluidtight end seal to a laminated plastic vessel or pipe section.

These objects and others ancillary thereto are attained by preforming either the cylindrical part of the vessel or pipe or the end portion and then molding the preformed part to the relatively unfinished other part of the vessel or pipe. The interior of the preformed section of the tube or vessel is provided with a plurality of indentations which decrease in depth toward the edge of the end section and the unfinished portion is built up about the finished portion with the aid of mandrels, etc. and molded to the finished portion. For example, when the tube or cylindrical part is preformed, a mold section having a concave or dished-in molding surface of approximately the same size as the interior of the tube is inserted into the tube so that the mold surface thereof is spaced slightly from the end to be closed off. Circles of resin impregnated fabric material which are somewhat larger than the diameter of the pipe are then placed in the opening between the end of the pipe and the interior mold section. Enough of these layers of cloth are provided to provide the desired rigidity and strength and the layers and then pressed into position into the pipe section. When the end section is preformed it is placed upon a suitable mandrel and the tube section is applied in a plurality of spiral layers of resin impregnated strips and then cured upon the mandrel and the end section.

The cloth employed may be any cloth material although for many purposes glass cloth, being strong and chemically resistant, is very desirable.

The process is applicable to any of the tubular resinous laminate materials for example the phenolics, the melamines and the polyester resins. The low pressure polyester resins are very satisfactory. The closure material should contain the same or similar resinous material as the resin which makes up the tubular portion.

The novel features characteristic of this invention are set forth with particularity in the appended claims. The invention itself, however, both as to its organization and its method of operation, together with additional objects and advantages thereof, will best be understood from the following description of specific embodiments when read in connection with the accompanying drawings in which:

Figure 1:
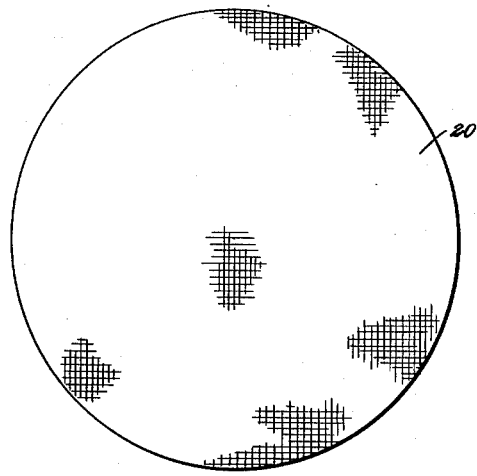
Figure 1 is a plan view of a circular cut resin impregnated fabric for closing the end.
Figure 2:
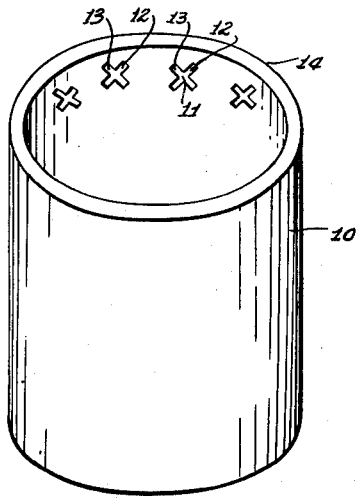
Figure 2 is a perspective view of the end of a cylinder or tube which has been prepared for the end closing process.
Figure 3:
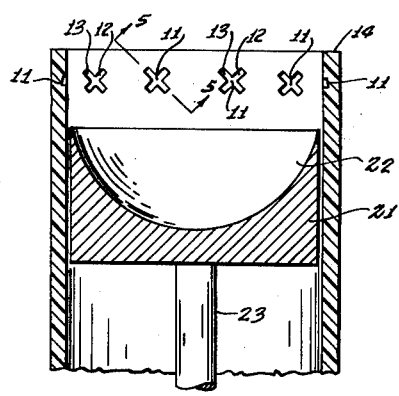
Figure 3 is a cross sectional view of a pipe section with the inserted mold part.

Laminated plastic equipment is strong and chemically resistant and useful in the construction of apparatus for the handling of chemicals, for example. Many times it is desirable to adjust the size to close off the ends of previously formed pipes or tubular vessels formed from such laminated plastic material and this invention as illustrated in Figures 1–5 has been developed especially for this purpose.

The tube, cylinder or vessel 10 which is to have its end sealed is first prepared by cutting, as with a small hand grinder, the indentations 11 therein. These may take the form of X-shaped grooves with the two legs 12 and 13 thereof cut at approximately 45° to the length or axis of the cylinder 10. In any event part of the indentations should extend in one direction similar to the leg 12 and part in the opposite direction similar to leg 13. As shown in detail at 13 in Figure 5 the depth of the indentations should decrease as the edge 14 of the cylinder is approached.

After the end of the cylinder 10 is prepared the mold section 21 is inserted in the tube so that the concave mold surface 22 approaches the indentations 11. Shaft 23 of the mold 21 supports the mold 21 in the proper position. A plurality of resin impregnated fabric sheets 20 are then placed in the cavity formed by the concave surface 22 and the sides of the cylinder 10 so that the marginal areas of the cloth are substantially parallel to the inside surface of the cylinder 10. A plurality of the sheets 20 are placed into the said cavity so that the desired thickness and strength is built up. The resin impregnated fabrics 20 are then welded to the cylinder 10 by pressing with the male mold member 25. The mold member 25 may be heated to cure the resin or the whole assembly may be heated.

Figure 4:
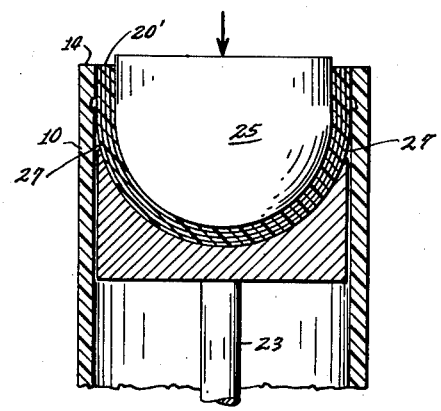
Figure 4 is a cross sectional view illustrating the molding process.
Figure 5:
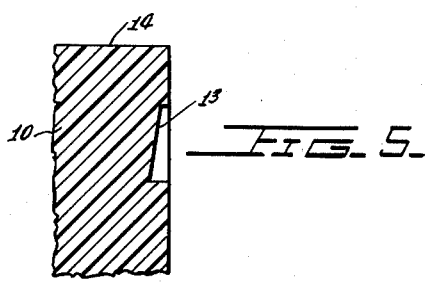
Figure 5 is a detail view taken on line 5—5 of Figure 3.

When the product is molded as shown in Figure 4 the resin from the sheets 20 fills the indentations 11 and also fills the angular space 27 formed between the cylinder 10 and the concave end 20' formed by the union of the layers 20.

*Example*

A pipe section of approximately 2" internal diameter and consisting essentially of a laminated glass cloth or tape which has been impregnated with polyester resin and molded to shape, is prepared for closing the end by cutting X-shaped indentations 11 therein about ⅜" long adjacent the end 14 thereof. A mold section 21 is inserted in the tube and approximately eight circular disks of glass fabric impregnated with the same polyester resin are arranged in the cavity formed between the end 14 and surface 22 of the mold. The diameter of the disks is somewhat over 3" and these disks are arranged to form the hemispherical insert shown at 20' in Figure 4. The disks are then pressed to shape and the resin is hardened or cured at an elevated temperature.

The process provides a very effective closure for the pipe or cylinder. Due to curved shape of the end, the application of pressure to the inside of the said pipe produces a force tending to expand the end against the side of the pipe thus making the bottom tighter and more secure. The curved shape of the end gives a greater welding or joining area especially since the resin fills in a portion of the angular space where the concave surface meets the interior tubular surface. The grooves being cut at approximately 45° angles to the direction in which the closure must move to "blow-out" serve to anchor the said closure and provide an increased welding area. Since these grooves 11 decrease in depth as the end 14 is approached the resin which flows into the said grooves 11 forms wedges which become tighter if the said end 20' moves toward the edge 14.

Figure 6:
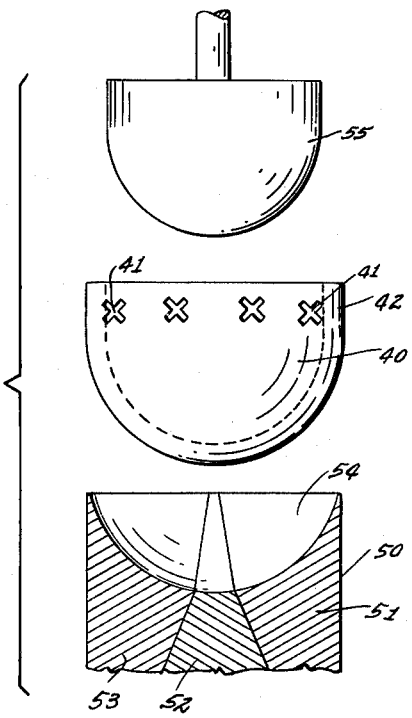
Figures 6 and 7 are views illustrating modified forms of the process and article.
Figure 7:
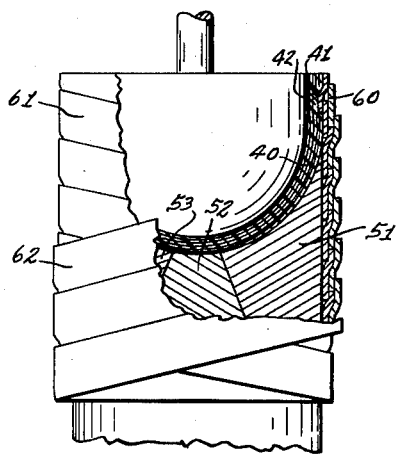

In the modification shown in Figures 6 and 7 the dished-in or concave end section 40 is preformed as by molding and has the crisscross indentations 41, 41 formed on the outside of the upper cylindrical portion 42 thereof. The indentations 41 may be formed in the end 40 during or after molding. To form the tube with the closed end by the modified process, the preformed end 40 is placed upon the concave surface 54 of the mandrel 50 and the tube portion is molded about the end 40. The cylindrical portion 42 projects above the concave surface 54. The mandrel 50 is formed in three (or more) parts 51, 52, 53 which interfit in known manner and are so shaped that one of the parts (shown as part 52) can be easily removed causing the mandrel to collapse so that the separate parts can be removed from the inside of the molded article. Resin impregnated tape 60 is then wrapped about the cylindrical portion 42 of the end section 40 and about mandrel 50 and the resin in the tape is then cured causing the tape to shrink upon the section 42 of the end 40 and into the cut out parts 41. The resin will inherently tend to shrink during curing and unite the various layers of tape as well as unite with the preformed end 40. Of course, the tape may be of various widths. In Figure 7 two spiral windings of tape 61 and 62 which are in opposite directions are shown but it is obvious that a denser winding or a greater number of windings can be employed. In order to support the cylindrical surface 42 of the preformed bottom or end, the support 55 may be inserted into the inside of the end 40. After curing the resin of the tape 60 the mandrel parts 52, 51 and 53 are removed and the tube with the integrally formed end closure is finished. Thus the natural inherent shrinkage of the resin cooperates with the indentations 41 in the bottom 40 to produce a united article which is thoroughly adhered together.

It is thus seen that by combining one preformed part with an incompletely cured lamination it is possible to simplify the molding operation and produce combined articles with superior strength and resistance to blow-outs. This superior strength and resistance of the resultant article results from the combination of the novel molding process together with the novel structure of the parts to be united.

We claim:

1. A process of producing a tubular, resin-impregnated, laminated structure with a closed end made up of a tubular section firmly united with an end section which has a relatively short, matching tubular portion which is united with said tubular section at the interior walls adjacent an end of the latter comprising the steps of providing a first of the two parts in its substantially completely cured and compact form, cutting indentations in that surface of the preformed first part which is to be united with a surface of the second part, placing said preformed first part upon a supplemental mold form adapted to fill in the space between the two parts of the finished article which are not to be united, placing the laminations impregnated with incured resin which laminations are adapted to form the second part upon the surface formed by the combination of the mold and the indented surface of the first part and curing the resin of the said second part laminations to unite the second part lamination to each other and to the said first part.

2. A process sealing the end of a tubular resin-containing cloth laminates comprising the steps of forming a plurality of indentations on the inside surface of the said tubular laminate adjacent to the end to be sealed, the indentations decreasing in depth as they approach the edge of the said end to be sealed, inserting a molding die with a concave molding surface into the tube with the concave molding surface facing but spaced slightly from the indented area of the inside surface, placing a plurality of resin-impregnated cloth disks of slightly larger diameter than the tubular product upon the end and the concave surface of the die so as to form a concave closure at the end, pressing the cloth disks against the die and the inside of the indented surface of the tubular object and curing the resin of the said disks while pressing the said disks against the concave die and the inside indented surface of the tubular product.

3. A process sealing the end of a tubular resin-containing cloth laminates comprising the steps of forming a plurality of X-shaped indentations on the inside surface of the said tubular laminate adjacent to the end to be sealed, the legs of the X-shaped indentations extending at approximately 45° angles with respect to the axis of the tubular laminate, and the indentations decreasing in depth as they approach the edge of the said end to be sealed, inserting a molding die with a concave molding surface into the tube with the concave molding surface facing but spaced slightly from the indented area of the inside surface, placing a plurality of resin-impregnated, cloth disks of slightly larger diameter than the tubular product upon the end and the concave surface of the die so as to form a concave closure at the end, pressing the cloth disks against the die and the inside of the indented surface of the tubular object and curing the resin of the said disks while pressing the said disks against the concave die and the inside indented surface of the tubular product whereby the resin from the cloth disks substantially fills the said indentations and the narrow portion of the angular space formed where the disks meet the inside surface of the tubular object.

4. As an article of manufacture a tubular laminated plastic section having a welded laminated plastic end closure section, each of said tubular section and said end closure consisting essentially of a plurality of layers of fabric material held together by a cured synthetic resinous material, one of said sections containing a plurality of indentations therein at the surface where it is united to the other section, the said indentations being filled with resinous material which is part of the resin impregnation of the said other section.

5. As an article of manufacture a tubular laminated plastic section having a welded end closure, said tubular plastic section consisting essentially of a plurality of layers of fabric material held together by a cured synthetic resinous material, said tubular plastic section containing a number of criss-crossed indentations on the inside surface adjacent the edge of the sealed end thereof, said welded end closure consisting essentially of a number of layers of cloth impregnated with the same resin as the resin of the tubular section, the said layers of cloth being larger than the opening in the tubular section and extending into the opening of the latter, so that the margins of the cloth layers are substantially parallel to the inside of the tubular section, the resin of said impregnated fabric uniting the layers of cloth of the end closure to each other and to the tubular section and extending into the indentations formed on the tubular section.

FRED. P. DUCATMAN.
CHARLES E. EISENMANN.

REFERENCES CITED

The following references are of record in the file of this patent:

UNITED STATES PATENTS

| Number | Name | Date |
| --- | --- | --- |
| 2,393,347 | Stuart et al. | Jan. 22, 1946 |
| 2,406,843 | Luth et al. | Sept. 3, 1946 |
| 2,525,469 | Anderson | Oct. 10, 1950 |